April 24, 1956 W. H. COULTER 2,743,321

AMPLIFIER HAVING SERIES-CONNECTED OUTPUT TUBES

Filed March 21, 1952 3 Sheets-Sheet 1

Inventor
Wallace H. Coulter
By J. Irving Silverman
Attorney

April 24, 1956 W. H. COULTER 2,743,321

AMPLIFIER HAVING SERIES-CONNECTED OUTPUT TUBES

Filed March 21, 1952 3 Sheets-Sheet 2

Inventor
Wallace H. Coulter
By J. Irving Silverman
Attorney

April 24, 1956 W. H. COULTER 2,743,321

AMPLIFIER HAVING SERIES-CONNECTED OUTPUT TUBES

Filed March 21, 1952 3 Sheets-Sheet 3

Inventor
Wallace H. Coulter
By I. Irving Silverman
Attorneys

United States Patent Office 2,743,321

Patented Apr. 24, 1956

2,743,321

AMPLIFIER HAVING SERIES-CONNECTED OUTPUT TUBES

Wallace H. Coulter, Chicago, Ill.

Application March 21, 1952, Serial No. 277,854

24 Claims. (Cl. 179—171)

This invention relates generally to electronic amplifiers and more particularly is directed to an amplifier for driving low impedance loads by means of at least a pair of series-connected tubes.

This application relates to an improvement over the amplifier described and claimed in my co-pending application Serial No. 82,677 filed March 21, 1949 entitled Amplifier Circuit Having Series-Connected Tubes, now Patent No. 2,659,775, issued November 17, 1953. This application is a continuation-in-part of said co-pending application.

Certain objects and advantages were referred to in connection with the invention set forth in said co-pending application, and all of said advantages and objects are achieved as well by the herein invention. In recapitulation, the degenerative action inherent in the top tube (that is to say, that tube whose plate is "free" and whose cathode is connected to the plate of the other tube, often designated the "bottom" tube) of a series-connected pair is compensated for as an important achievement of the invention and all of the great advantages of substantially perfect push-pull output are available. The desideratum is the achievement of making the input to the top tube independent of the load so that as closely as possible identical signals equal and opposite in phase can be applied to the two tubes.

The output of the amplifier is adapted to feed, not only loads of low impedance (which in and of itself is a great advantage and economy) but also loads in which the impedance varies over a wide range. Certain expedients for compensating for the degeneration of the top tube (i. e., its dependence upon the load voltage) and described in said co-pending application are equally applicable to this invention, and it is to be understood that same may be substituted for circuitry shown in the alternative herein. In addition to the above, a novel manner of connecting the load is suitable for adaptation with either or both inventions, in which the amplifier not only may be operated class A, but may also be operated class AB or B without giving rise to significant distortion in the signal output.

The invention herein differs from that of the co-pending application in that circuits are used which are believed to be more economical, convenient and efficacious. Excellent push-pull balanced output results are obtained from the application of these circuits to the series-connected pair. Many of the phases of the invention herein are equally applicable and serve to render more efficient the circuit of the said co-pending application.

In both applications I have referred to degeneration occurring in the top tube of a series-connected pair by virtue of said top tube acting as a cathode follower. This degeneration is said to be compensated for or neutralized. The effect of this degeneration is that the input circuit of the top tube is tied in with the output so that it rides the load voltage. Obviously under these circumstances it is impossible to achieve substantially balanced inputs to the two tubes. Some method of countering this effect is intended by the so-called "compensation" or "neutralization," the net effect of which is intended to be the same. I utilize a voltage obtained from the load as a sort of "sensing" voltage and apply it in a manner to offset this degenerative effect. In the case that the voltage from the load, i. e., the sensing voltage is applied to the bottom tube of the series-connected pair, I call it compensation. In the case that the sensing voltage is applied to the top tube I call it neutralization. As stated, it is immaterial what the designation is, since the net result is the same. That result is the achievement of substantially independent input to the top tube, so that it can be adjusted independent of the load voltage and therefore can be made equal in amplitude and opposite in phase to the signal appearing at the input of the lower tube.

The exact nature of the electrical processes involved in applying a portion of the load voltage, i. e., a sensing voltage, to one or the other of the tubes to achieve the desired balance is not readily resolved through simple explanation. As a matter of fact, the theory by virtue of which I explain the same may not be actually correct in every respect, but it is not intended to be limited by such explanations which are only included herein to aid in an understanding of the structure by virtue of which the circuits operate successfully. The top tube must have a total voltage, i. e., including the signal, applied to its grid which has a definite relationship with the load voltage. The top tube cannot be hanging as an isolated element since obviously the output load voltage appears from the juncture between the two tubes and A. C. ground. The voltage derived from the load as a sensing voltage therefore establishes the required relationship between the top tube of the series-connected pair and the load.

While it is an object of the invention generally to provide a circuit for an amplifier having a pair of series-connected tubes in which novel circuit means are provided for supplying a sensing voltage derived from the output to the top tube to achieve substantially balanced push-pull operation in driving a load, the basic structure is fully described and claimed in my co-pending divisional application Serial No. 464,437, filed October 25, 1954. The particular objects of this invention are set forth below and pertain to various improvements which provide increased utility and efficiency of performance of the basic amplifier.

One object of the invention is to provide a novel circuit which will drive the series-connected pair of output tubes with a relatively rounded wave form signal so that during the application of amplifier in driving loads of lower than normal impedance, the tendency of the output signal to be peaked substantially will be reduced whereby much distortion will be eliminated.

Still a further object of the invention is to provide means in an amplifier of the character described for decreasing the loss of amplitude and shifting of phase in the sensing voltage which may occur at very high or very low frequencies in order to maintain the proper input to the tubes of the series-connected pair.

Many other objects and advantages will occur to those skilled in the art, and many salutary benefits are achieved through the use and application of the invention in different manners. Great economy and efficiency are achieved through the use of a minimum of easily obtained components, while not permitting the fidelity and response of the amplifier to suffer.

In compliance with the statutes, I have specifically described preferred embodiments of the invention and I have illustrated the same in some detail, but only diagrammatically utilizing the conventional symbols well known for that purpose. It is desired to emphasize that such illustrations and explanation are not intended as a limitation on the invention, but are for the purpose of rendering lucid the exact and complete explanation of the nature of the advance I have made in the arts and sciences. Many modifications and variations are possible within the purview of the invention and without departing from the scope thereof.

Figure 1:
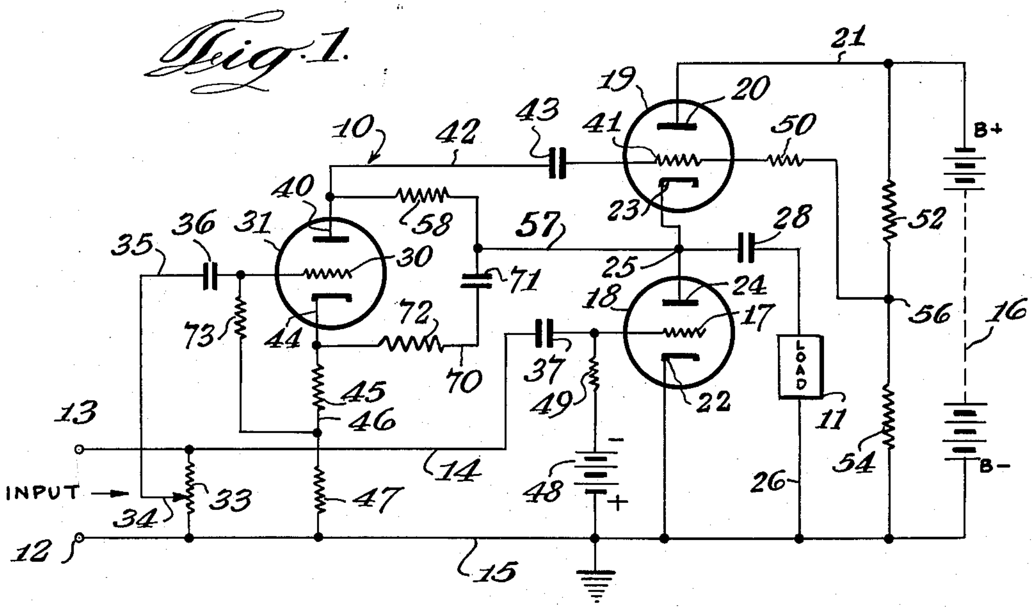
Fig. 1 is a circuit diagram of an amplifier constructed in accordance with my invention, and showing a simplified form thereof.

Referring now to the drawings, especially to Fig. 1, I have illustrated a somewhat simplified form of the invention comprising an amplifier 10 adapted to drive a load 11 indicated by a block. Said load may be resistive or inductive, and may be considered for example as the voice coil of a speaker. The input to the amplifier 10 may be derived from any suitable source such as for example a prior stage. The flexibility of the amplifier embodying the invention is quite great, and same may be considered as a high fidelity, broad band device, capable of supplying an output with excellent characteristics over a very wide frequency range.

The amplifier 10 comprises several parts which broadly can be referred to in generally describing the same. The input terminals at the left, designated 12 and 13 feed what I have termed the inverter or lifter portion while at the same time feeding the lower tube of the series-connected pair of tubes. The latter pair of tubes, together with output connections I term the output portion. The signal is inverted by the inverter and fed in opposed phase relation to the upper of the series-connected pair so that the output portion is properly driven to achieve the benefits of balanced output. In order to neutralize degeneration in the top tube of the series-connected pair, a sensing signal from the juncture between the tubes is fed through the plate resistor of the inverter section. The advantage of this type of neutralization over that described in the previous application is that by the arrangement generally referred to above, and more specifically pointed out below, the top tube of the series-connected pair is more easily and simply driven with the high amplitude signal that it requires. The signal for the top tube is lifted by the sensing signal so that its level is above that of the load and independent thereof.

Specifically, the terminals 12 and 13 feed the leads 14 and 15. Lead 15 is the common ground and it is the negative end of the B supply designated generally 16 on the right hand side of the circuit diagram. In certain instances the lower end of the B supply may be below ground, but this will be discussed hereinafter. The lead 14 is connected through condenser 37 to the grid 17 of the lower tube 18 of the series-connected pair. The tubes 18 and 19 are both triodes, as shown, with the upper plate 20 connected by way of conductor 21 to the positive end of the B supply 16, and the lower cathode 22 connected to ground.

The upper cathode 23 and the lower plate 24 are connected together at the juncture 25 from whence the load lead 26, extends to ground, with the load 11 and a series condenser 28 in the said lead.

The condition which gives rise to the degeneration in the top tube 19 arises by reason of the voltage which appears between the load junction 25 and ground. As far as the load 11 is concerned, and irrespective of the connection of the opposite end of the lead 26 (i. e., it need not be connected to ground, but may have other connections) the upper tube 19 is similar in action to a cathode follower which is inherently degenerative. Any voltage appearing between juncture 25 and ground will appear as well in the grid-cathode circuit of the upper tube unless compensated for or neutralized, as pointed out in the said co-pending application.

The signal from the previous source is also impressed directly upon the grid 30 of the inverter tube 31 which as noted is also a triode. In order to acquire such signal, a potentiometer 33 is connected from the conductor 14 to ground, and the slider 34 connected to the grid lead 35. The coupling condensers 36 and 37 are provided so that the proper negative bias voltages may be applied to grids 30 and 17 respectively.

The slider 34 is adjusted along the potentiometer 33 so that the signal component appearing at the plate 40 of the inverter tube 31, and hence that also appearing at the grid 41 of the top tube 19 is equal in amplitude to that appearing at the grid 17 of the lower tube 18.

The plate 40 drives the grid 41 by way of lead 42 through a coupling condenser 43. The tube 31 has a grid leak 73 and the cathode 44 has a biasing resistor 45 in its lead 46. Another resistor 47 is connected between the resistor 45 and ground, the purpose of which shortly will be explained. The lower tube 18 is biased by the bias supply 48 which is in series with the grid leak 49 and ground. The bias of the upper tube 19 is achieved through the grid leak resistor 50 which is connected between a pair of voltage dropping resistors 52 and 54 arranged in series across the B supply 16. The bias upon the upper tube 19 is thus equal to the voltage from juncture 56 to ground minus the voltage from juncture 25 and ground. The resistors 52 and 54 are chosen to give the desired negative bias.

The circuit as thus far described is substantially the same as that of the said co-pending application. Thus far, no means have been described for neutralizing the degeneration in the top tube 19.

The plate 40 is supplied with a sensing signal that is derived from the juncture 25 between the tubes 18 and 19 and which signal appears from juncture 25 to ground. This is the same signal occurring across the load 11 and the condenser 28 in series. There is a conductor 57 between said juncture 25 and the plate 40, having a resistor 58 series-connected therein. Said resistor 58 functions as the plate load resistance of tube 31 and derives its positive D. C. operating potential from junction 25.

Disregarding for the moment the problem of properly and satisfactorily operating the lifter tube 31 at the most efficient conditions of its characteristics, the effect of applying the sensing signal obtained from the juncture 25 by way of the lead 57 through the plate resistor 58 is that the grid 41 of the top tube 19 is supplied with at least a part of such signal. The signal component derived from the input appearing at the plate 40 and that appearing at the juncture 25 are in phase. Because of this, less of the relatively high amplitude required by the grid 47 need be provided by the inverter tube 31.

As explained in the co-pending application, when neutralizing the degeneration which is characteristic of the top tube of the series-connected pair when same is driven from ground, the objective is to cause a voltage to appear at the grid of the top tube which is equivalent to the arithmetic sum of the voltage appearing from the cathode 23 to ground 15 and the signal voltage appearing across the input of the lower tube 18 from its grid 17 to ground. When this is accomplished the net voltage appearing from the grid 41 to the cathode 23 (the effective input signal of the top tube) is equal to that appearing across the input of the bottom of the series-connected tubes. In effect, the plate 40 of the lifter tube 31 is caused to follow whatever voltage appears at the output junction 25.

In the said co-pending application this was accomplished entirely by introducing a portion of the voltage sensed from across the output, i. e., secured from the juncture 25 between the series-connected tubes, into the cathode circuit of the lifter or inverter tube in such a manner that it appeared at the plate (equivalent to plate 40) in the same phase and magnitude as the voltage appearing at the cathode of the top tube. The signal from the previous stage was introduced into the grid-cathode circuit of the inverter tube.

Referring now to Fig. 1, it will be seen that the amount of sensing voltage acquired from the output juncture 25 which appears at the plate 40 due to the plate resistor 58 being tied to the juncture 25 through the lead 57 is a function of the impedance relationship of the resistor 58 to that of the entire plate circuit. In other words, there is an impedance divider, one branch of which is the resistor 58 and the other of which is the total impedance from the plate 40 through the plate circuit of the tube 31 to ground. When the impedance from the plate 40 to ground is many times the impedance of the resistor 58, then substantially all of the sensing voltage will appear at the plate 40 and consequently be available at the input of the top tube 19.

In the case of triodes the plate impedance is moderate, and as seen in Fig. 1 the tube 31 is illustrated as a triode. Under such circumstances, and unless other means are used, the resistance of the plate resistor 58 may be several times the total plate impedance of the tube 31 such that perhaps only one-half or one-third of the sensing voltage appearing at the juncture 25 will be available at the grid 41. This may be totally inadequate to obtain the kind of balanced operation desired and hence it may be essential to utilize some additional means to assure that the grid 41 obtains the major portion of the sensing voltage derived from the juncture 25 through resistor 58. This can be done by increasing the apparent plate resistance of the tube 31. One means is to add cathode degeneration by the insertion of a relatively large cathode resistor 47 in the lead 46 so that the total impedance from the plate 40 to ground is increased. This is a convenient method in the case the voltage gain of the output section is low.

The effect of cathode degeneration to diminish the loading action of the plate impedance of the tube 31 may be augmented or replaced by introducing into the cathode circuit a voltage component also derived from across the load and obtained from the junction 25 as described in the co-pending application for the purpose of neutralizing the degeneration inherent in the top tube of the series-connected pair. This is accomplished in Fig. 1 by providing a current path 70 composed of the resistor 72 and blocking condenser 71 in the path, used in conjunction with a suitable impedance between the cathode 44 and ground. The amount of the sensing voltage which is fed through this path into the grid cathode circuit of tube 31 is obviously less than in the co-pending application because a substantial portion of the sensing voltage is acquired at the plate 40. Through this arrangement, i. e., path 70, the size of the cathode resistor 47 may be substantially reduced, which is advantageous in decreasing D. C. and signal voltage losses of tube 31.

Referring to the series-connected tubes 18 and 19, the maximum impedance of the tube 31 to ground is limited in Fig. 1 by the resistor 50. In some instances this effect may be small enough to be ignored, but in other instances its loading action may be offset by adjustment of the feedback path 70. Its adverse loading effect on the plate circuit of tube 31 may also be eliminated in another manner which will be described hereinafter.

In the co-pending application, the large amplitude signal required by the grid 41 was produced entirely by the voltage swing of the inverter tube. The incoming signal from the previous stage and the sensing voltage obtained from the juncture between the series-connected tubes were both injected into the grid-cathode circuit of the inverter tube. This required rather large signal handling capabilities of the inverter tube which are not always economically obtainable. It will follow from the explanation above, that as a result of injecting at least a portion if not all of the load sensing voltage into the plate circuit of the inverter tube 31 as taught in this application, the total voltage applied to the grid cathode circuit of the tube 31 is greatly reduced and a much more economical circuit design is possible.

In recapitulation, I have provided a circuit in which the sensing voltage from the juncture 25 is applied at the plate 40 through the plate resistor 58 to decrease the demands made on the tube 31, i. e., so that all that need be supplied thereby is a signal equal and opposite in phase to that appearing at the cathode 17 of the tube 18. This still provides the high amplitude signal required at the grid 41. In the case where the tube 31 is a triode having low plate impedance, I increase the effective plate resistance through the provision of cathode degeneration in a series cathode resistor 47. (Obviously I can use a tube with higher plate impedance, but this presently will be discussed.) If the circuit cannot afford the loss of useful D. C. and signal voltage across a high ohmage cathode resistor, I augment or replace the same by means of a feedback path 70, which at least permits of a reduction of the value of the cathode resistor 47.

Coincidentally with the utilization of a feedback path 70, I am enabled to compensate for high frequency losses occasioned by the increased importance of stray capacitance between plate 40 and ground. In the case which I have discussed, the path 70 is merely a non-frequency-selective path and the condenser 71 was a blocking condenser of fairly large size, the resistor 72 being selected depending on the gain of the tube 31 and the total cathode resistance so that the desired portion of the sensing voltage derived from the juncture 25 was introduced into the cathode circuit. This same path can also be used for high frequency compensation, in a manner which will be described hereinafter in connection with the circuit of Fig. 4.

Figure 2:
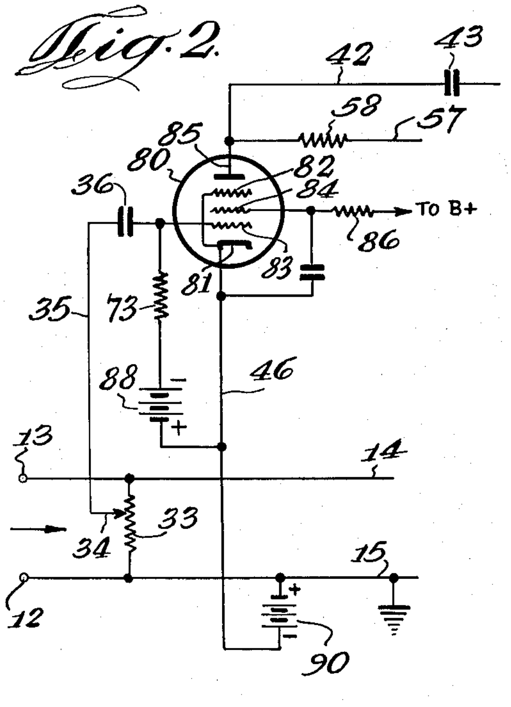
Fig. 2 is a circuit diagram showing the inverter or lifter portion of an amplifier constructed in accordance with my invention, the difference between the inverter portion of Fig. 1 and the illustration being that a screen grid tube is used in said Fig. 2.

In the circuit of Fig. 1 the inverter or lifter section was shown as a triode, and the attendant disadvantages of low plate resistance were pointed out. In Fig. 2 there is illustrated the inverter section of an amplifier which may be similar in every respect to that of Fig. 1 with the exception that the tube used is a pentode 80 having a cathode 81, connected with the suppressor grid 82, grid 83, screen grid 84, and plate 85. Lead 57 with series resistor 58, and lead 42 with blocking condenser 43 both connect to plate 85. The input to the tube 80 is the same as in the case of Fig. 1. The screen grid 84 is biased through a dropping resistor 86 from a suitable B supply and bypassed through condenser 87 to the cathode 81.

The plate resistance of a pentode is inherently very much higher than the plate resistance of a triode. In the event that pentodes (or other screen grid tubes) are used instead of triodes in the inverter section of the amplifier, it will not be necessary in many instances to use means for decreasing the loading effect of the tube 80 on the plate resistor 58. Specifically, it may not be required to use the cathode degeneration occasioned by a high cathode resistor (see 47 of Fig. 1) or the additional or alternate injection into the cathode circuit of a portion of the load sensing voltage (through the path 70 of Fig. 1). This latter expedient may, however, be useful to supply voltage loss due to loading of the plate resistor by the grid leak circuit through resistor 50 as discussed in connection with Fig. 1. The path 70 can therefore be used in connection with the tube 80 and its frequency selective characteristics may be utilized as will hereafter be described.

Note in Fig. 2 that the bias for the grid 83 is obtained by means of a biasing battery 88 in series with a grid leak 73 to the cathode lead 46. In order to obtain sufficient plate potential for the tube 80, the cathode lead 46 is connected to a potential below ground as shown at 90. This, of course, may be a part of the B supply for the entire amplifier.

In connection with the use of cathode resistors in the inverter or lifter section it is pointed out that the operation as a lifter does not preclude the use of cathode resistors or other impedances for cathode compensation of low or high frequency plate circuit losses; or the use of the voltage drop across such a resistor to drive the bottom tube of the series-connected pair in which case the lifter section becomes the familiar split phase inverter.

Figure 3:
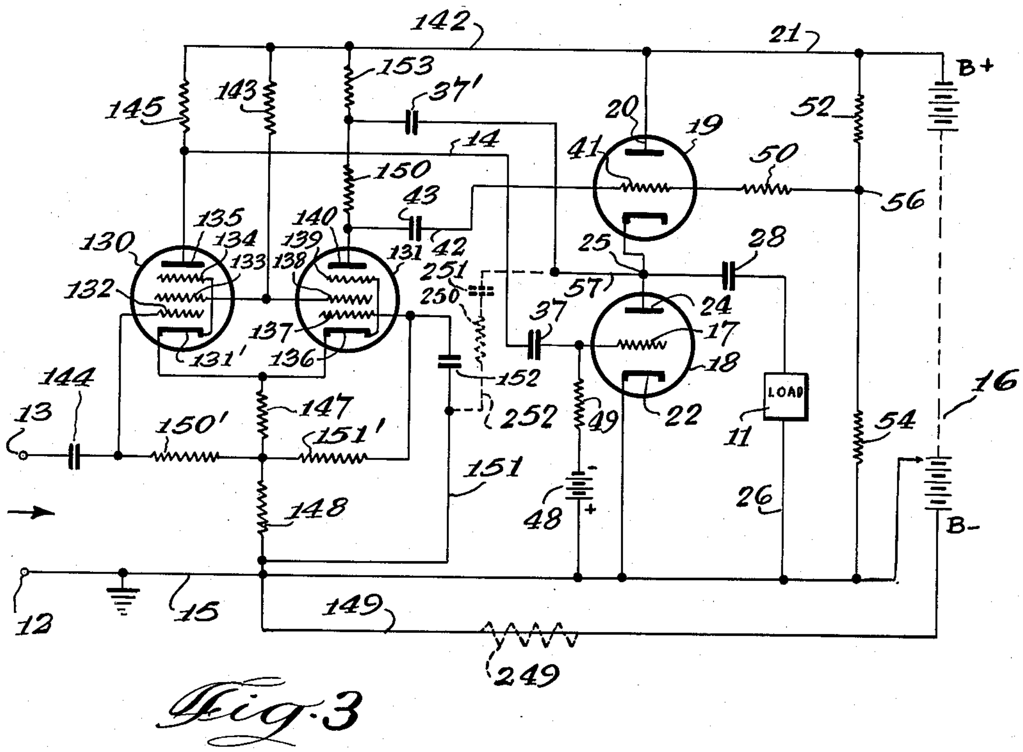
Fig. 3 is a circuit diagram of a modified form of amplifier in which the input comprises a cathode-coupled pair connected in a novel manner.

In Fig. 3 I have shown a modified form of the input section of the amplifier which supplies the inverted and the normal signals to the tubes 18 and 19. In this arrangement I use a cathode-coupled pair of tubes, which are here shown as pentodes 130 and 131. The left pentode 130 has a cathode 131, grid 132, screen grid 133, suppressor 134 connected to the cathode, and a plate 135. The right hand tube 131 is similarly constructed with cathode 136, grid 137, screen grid 138, suppressor 139, and plate 140. The cathodes 131 and 136 are connected together by lead 141 and the screens 133 and 138 are both biased from the B plus lead 142 (which connects with lead 21) through the common resistor 143.

The signal from the previous apparatus appears at the terminals 12 and 13 and is applied to the grid 132 through the coupling condenser 144. Signal current flows in the tube 130 and produces a drop across the plate resistor 145. The signal is then applied to the grid 17 of tube 18 through the lead 14 and the coupling condenser 37, the lead 14 being connected to the plate 135 of tube 130. The same signal current flows through the common resistors 147 and 148 in lead 149 thereby producing a voltage drop across these resistors. This serves to drive the second tube 131 through its cathode circuit, which is common to both tubes by reason of connection 141. The grid 137 of the second tube 131 is connected by lead 151 through a blocking condenser 152 to lead 149 across the cathode resistors 147 and 148. The resulting signal flowing in the plate circuits of the second tube 131 produces a voltage drop across the plate resistor 150. By proper choice of circuit components, especially considering the cathode resistors, the signal thus appearing across the plate resistor 150 can be caused to be substantially identical to the signal occurring across the plate resistor 145, but of opposite phase.

The sensing voltage previously discussed is introduced by way of lead 57 and blocking condenser 37' into the plate circuit of the tube 131 between resistors 150 and 153. The resistor 153 provides a D. C. path for the plate current of tube 131 and is a means of providing the top end of plate resistor 150 with a higher D. C. potential than appears at the junction. Although dissipative of power since it is in effect across the load, its resistance is large compared with the load impedance and power loss therein is very low. The condenser 37' serves effectively to tie the resistor 150 to the junction insofar as signal components are concerned.

The tube 131 and previous tubes 31, 80 have been described as lifters because the plate resistors operate at a level above ground and each is independent of any voltage occurring between that level and ground. I have provided a means whereby the proper signal for the operation of the top tube 19 is economically and conveniently obtained, in a manner not heretofore disclosed or known in the prior art.

Note that the cathode resistors must have values such as to provide adequate coupling for balanced operation of the tubes 130 and 131. They are connected in the lead 149 which, instead of being connected to ground 15 is connected below ground as in the case of the circuit of Fig. 2 to provide greater total plate operating voltage to accommodate the added resistor drops.

The circuit of Fig. 3 which utilizes the cathode coupled tubes 130 and 131 has an added advantage which augments the fidelity achieved by virtue of using balanced output principally in the case that the output of the amplifier is feeding loads whose impedance is lower than the ordinary. In the use of series-connected pairs, or push-pull arrangements, it is known that the even harmonics are balanced so that greater fidelity is obtained. When the impedance of the load drops below some range there occurs a peaking of the signal wave form which destroys fidelity and which is caused by odd harmonics. The lifter circuit described can be adjusted to provide rounded top signals to the series-connected pair to compensate for the peaking due to low impedance loads. In a typical case the output stage consisting of series-connected triodes each having a nominal plate resistance of 300 ohms, when used with a 150 ohm load (which is about half the normal value) there is produced a peaked wave having approximately seven percent odd harmonics. By proper adjustment of the cathode-coupled pair a rounded top wave form having substantially equal amount of odd harmonics in opposing phase was introduced into the grids of the series-connected tubes. As a consequence the harmonics occurring in the final signal were measured at approximately one percent.

The cathode-coupled pair is adjusted to provide a rounded wave form by driving the tubes hard. Normal operation of a cathode-coupled pair is characterized by a small amount of such distortion and the amount of distortion can be exaggerated by driving the tubes near cut-off. The desired amount of distortion can be obtained for the kind of load used. There are other means of obtaining rounded wave forms, but the most effective is the cathode-coupled pair.

The significance of the circuit described is greatly emphasized when the ordinary practice of push-pull amplification is considered. Consider that a conventional push-pull pair of tubes each having a plate resistance of 300 ohms is driving a load. The load sees the impedance as 600 ohms, and in accordance with that which is considered good practice, the load should be of the order of twice the impedance of the driving circuit, or 1200 ohms or higher.

The series-connected pair using the same tubes halves the output impedance because of the manner in which same are connected, so that the load looks back into an impedance of 150 ohms. This would normally call for a load of 300 ohms or more. It is of course understood that the two to one relationship between load impedance and output impedance has been considered good practice in order to eliminate the third harmonic peaking which I have eliminated by driving the series connected pair with a rounded wave form signal. Therefore, I can drive a load of much lower impedance, having a matched load if I desire, and thus can feed a 150 ohm load. This is an overall improvement over the prior known circuits of the order of 8 to 1 in reduction of impedance.

The reduction of the odd harmonics distortion by a factor of about 5 or more to one through my apparatus therefore makes practical the operation into such extremely low impedance loads without exceeding the distortion limits of normal high impedance loads. The reduction of objectionable distortion is of the same magnitude as the reduction of even harmonics obtained by push-pull operation. There is a loss of plate efficiency, but this is of secondary importance in view of the economy and high fidelity obtained.

There are many important advantages in being able to achieve such distortionless operation into low impedance loads. For example, in voice coils of speakers, the space available for wire is at a premium. The frequency response of the speaker depends upon the ability of the voice coil to vibrate readily, and low mass cannot be achieved with a large amount of wire which would be required if the load impedance had to be high. The prior practice in compromising for the two factors—low mass and high impedance—has been to wind voice coils with very fine wire. This of course is not economical. By the use of my amplifier very small voice coils can be made with low impedance and fewer turns.

It should be pointed out that by means of the balanced operation of the series-connected pair as achieved when the degeneration of the top tube is neutralized as described herein, not only are all of the advantages set forth above made possible, but furthermore the coupling of the load with the amplifier need not be accomplished by the use of expensive transformers. One may also consider an additional economy in the overall picture by realizing that the previous stage has its signal coupled to the amplifier herein described also without a transformer.

Figure 4:
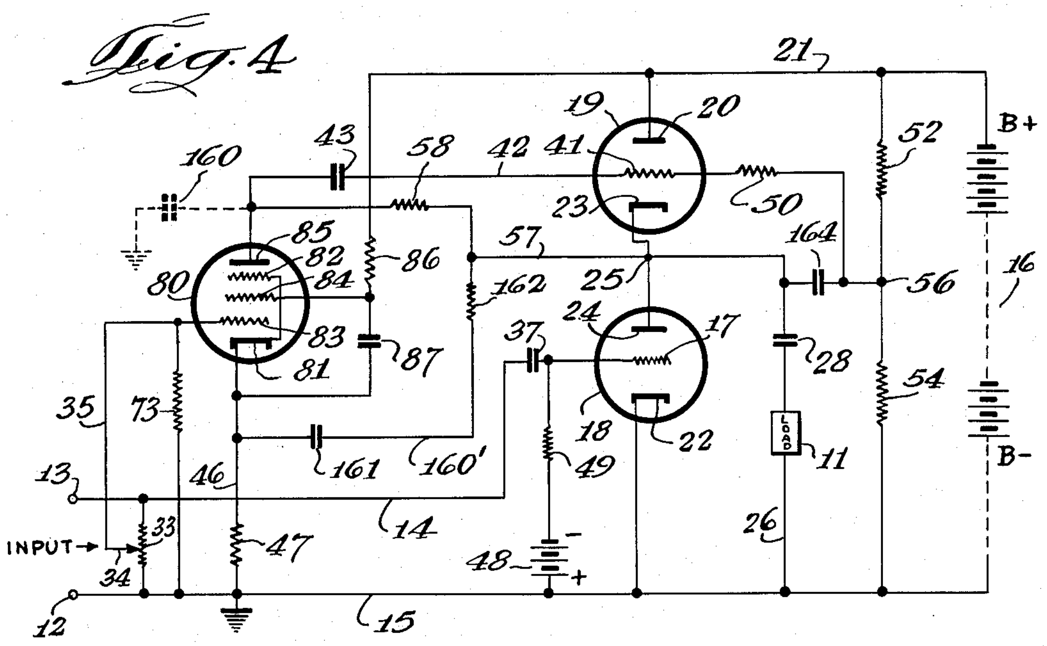
Fig. 4 is a circuit diagram of another modified form of the invention in which means are provided for reducing undesirable effects caused at high and low frequencies.

In Fig. 4 I have shown an amplifier the circuit of which is similar to that of Fig. 1 with the exception that the inverter or lifter section comprises a pentode connected similarly to that of Fig. 2. As previously mentioned, some difficulties arise in the case that an amplifier is required to pass very high or very low frequency signals. In Fig. 4 I have shown a manner in which these difficulties are somewhat alleviated.

In the case of high frequencies, stray capacitance to ground from the grid circuit of the top tube of the series-connected pair can most seriously affect the balanced operation and overall performance of the amplifier. The stray capacity paths include wiring capacitance, capacitance between plate 20 and grid 41, and the usual stray capacitance and can be designated as a single lumped capacitance 160 connected to plate 85 and shown in broken lines. The existence of this path introduces an amplitude loss and a serious phase shift in the sensing signal which is being fed to the grid of the top tube 19 and which prevents the series-connected pair from evolving a truly balanced signal for the load. Because of the capacitive loading action on the resistor 58, insofar as voltage from the junction is concerned, a voltage component from the output appears across the resistor 58 which of course is applied across the input of the top tube 19. This extraneous component can cause very serious unbalance at high frequencies and must be compensated for if the amplifier is to have an optimum wide band of response. It is especially serious when the voltage gain of the output stage is large.

Compensation may be made for both the phase shift and the loss of amplitude by injecting into the grid cathode circuit of the lifter 80 a signal derived from across the load through a path which provides phase and amplitude effects opposite in character. Such a component is introduced into the grid cathode circuit of the tube 80 to provide the desired compensating effect. A path 160' is established from the lead 57 to lead 46 through a series capacitor 161 and a series resistor 162 chosen to have an effect to provide the necessary opposite phase shift and increase in voltage desired at the plate 85. The resistor 162 may be eliminated in some instances so that the return path will then consist of the capacitor 161 alone.

In Fig. 1 it can be seen that the grid leak 50 is so arranged that it may load the plate resistor 58. This is true irrespective of the plate impedance of the lifter tube 31 and applies as well in the case of pentode tubes. The loading action reduces the amount of the sensing voltage which is derived from junction 25 available at the plate 40. This loss may be prevented by driving the junction 56. As previously mentioned the loss can be overcome by injection of a portion of the sensing voltage into the cathode 44 of the tube 31. In addition to the loading of the plate resistor 58 at mid-frequencies, at low frequencies there is an amplitude loss and phase shift across the coupling condenser 43 which can upset the effective balanced action required for push-pull operation.

The adverse effects described can be eliminated by providing an auxiliary low frequency path through the condenser 164 from the juncture 56 to the juncture 25. The action of the condenser 164 is to increase the effective impedance of the grid leak 50. The impedance measured from the juncture 56 to ground is preferably made high through selection of the proper values of resistors 52 and 54 so that an economical size of condenser 164 is derived and so that the output energy lost in the resistors will be small. The result desired is that the juncture 56 is driven, i. e., it is at the same phase and potential as the juncture 25.

Figure 5:
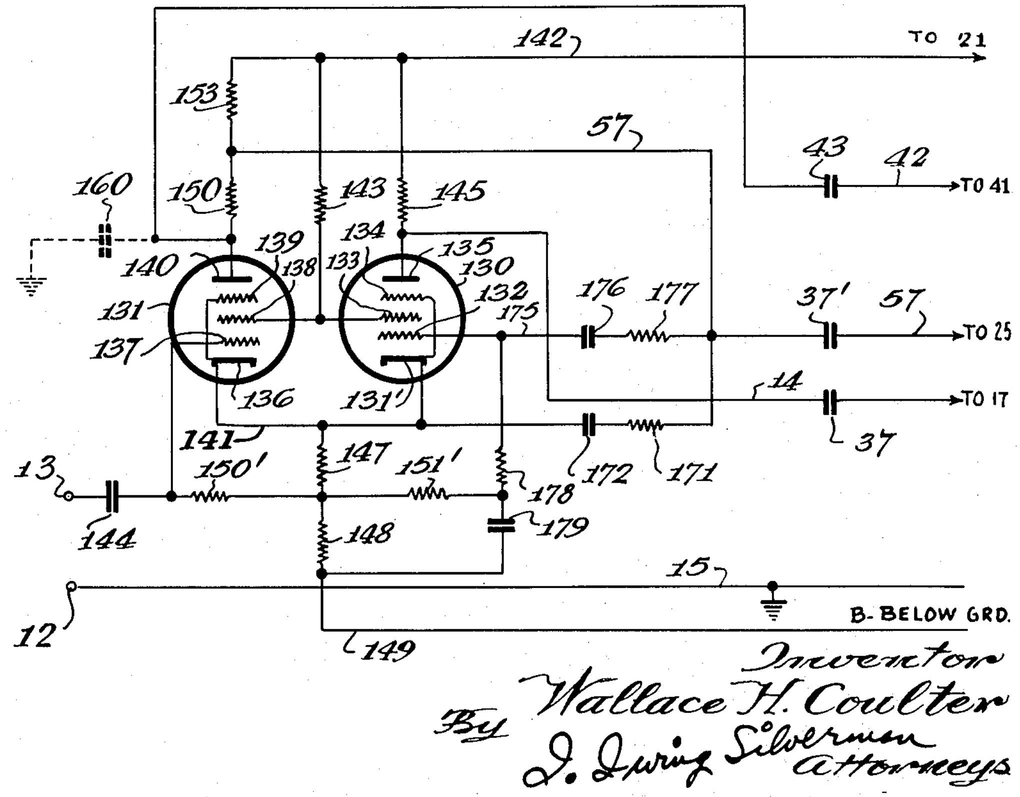
Fig. 5 is a circuit diagram of another modified form of my amplifier in which means similar to that shown in Fig. 4 are used to reduce undesirable high frequency effects in the case the input comprises a cathode-coupled pair.

In Fig. 5 I have illustrated an amplifier in which I use the lifter arrangement of Fig. 3. Similar problems already discussed with respect to high and low frequencies occur, and the solution thereof in the case of the high frequencies requires a modified form of circuit. Again the lumped stray capacitance is designated 160, and is shown connected to the plate 140 of the tube 131. The problem here is to inject a component of voltage into the plate circuit of only the lifter portion of the cathode-coupled pair without affecting the other tube. This is an important problem because of the inherent nature of cathode-coupled pairs that causes signals from one tube to affect the other. Obviously the introduction of any component into the cathode circuit will have identical results upon the plate currents of both tubes.

Attention is invited to the fact that the positions of the tubes 130 and 131 have been changed in Fig. 5 from their positions in Fig. 3 for convenience.

The problem of isolating the tube feeding the lower of the series-connected pair is solved by introducing the high frequency compensating voltage (which is a part of the sensing voltage) to the common cathodes, and then introducing a part of the same signal to the grid of the tube feeding the lower of the series-connected pair. This prevents the output of that tube from being altered.

The juncture 25 is connected by lead 57 through condenser 37' to the plate 140 of the lifter tube 131 through the plate resistor 150. A portion of the voltage is impressed upon the common cathode through the lead 170 having series connected resistor 171 and capacitor 172. This, then provides the desired compensation voltage which will appear at the plate 140 to take care of the phase shift and high frequency losses affecting the grid 41 of the top tube.

We do not wish that the tube 130 be affected in this manner, and hence we feed the identical signal by way of the lead 175 from lead 57 to the grid 132 through a series-connected resistor 176 and capacitor 177. This introduces into tube 130 a voltage which will have an effect at the plate 135 opposite to the effect produced thereat by the voltage introduced through the cathode. The net result is that the signal output from plate 135 to the grid 17 of the lower tube 18 is unaffected. The signal introduced into grid 132 appears across resistor 178 which is connected into the grid cathode circuit. The blocking condenser 179 is connected to lead 149 which may be below ground.

Insofar as pentodes are concerned another way of stating that the voltages introduced at the grid and cathode of the tube 130 compensate for one another is to state that the sensing voltage component introduced into the cathode circuit is not permitted to establish any voltage difference between the cathode and grid of tube 130 and thereby prevents any change in the plate signal output caused by that component of the sensing voltage.

In cases where the second tube of the cathode-coupled pair as shown in Fig. 3 is the lifter, and it is desirable that the sensing component not appear in the plate circuit of the first tube, said signal can be introduced at the grid of the first tube or somewhere earlier in the circuit. This might even be for example in a previous stage.

The apparatus of the invention can utilize the advantages inherent in inverse feedback well-known in the art. It has been deemed unnecessary to show the exact manner of such application in order to keep the description and drawings simple. One convenient method is to utilize the cathode-coupled pair of tubes 130 and 131 of Fig. 3 and is illustrated by broken lines. A resistor is added in lead 149 below resistor 148. This is shown at 249. A feedback path 252 which will usually comprise a resistor 250 in series with a blocking condenser 251 is provided between output junction 25 and lead 151. It will be noted that the feedback voltage appearing across resistor 249 is applied in the grid-cathode circuit of the input tube 130 and is not in anywise directly fed into the grid-cathode circuit of tube 131. The feedback components applied to tube 130 are coupled into the grid-cathode circuit of tube 131 by virtue of the common resistors 147 and 148. This arrangement is preferable to negative feedback into the grid circuit of tube 131 as would be accomplished conventionally by disconnecting lead 151 from below resistor 148 and connecting it across a part or all of the output of the series-connected pair.

It is believed that the invention has sufficiently been set forth in detail such as to enable one skilled in the art to which same appertains to make, construct and use the same. It is again emphasized that theoretical explanations are by way of assisting in an understanding of the invention in all of its phases and not by way of limitation.

Although the schematic circuit diagrams and the specification are deemed sufficient to enable one to construct the devices therein described, some comparative values of the components for practical examples are believed of assistance.

In Fig. 1 the lifter section could be constructed about a 6C4 tube (31) or better yet, one with a higher amplification factor such as for example a section of the dual triode tube 12AX7. The plate resistor 58, the grid resistor 73 and the cathode bias resistor 45 are convenient typical resistors for resistance coupled stages. The degenerative resistor 47 may range in value from a fraction of the resistance of the plate resistor 58 up to about equal resistance. In order to obtain enough voltage output from the tube 31 to drive the tube 19 to full output it may be necessary to connect the bottom end of the resistor 47 to a source of negative potential to obtain sufficient operating potential to supply the voltage drops across the tube 31 and the resistors 58, 45, and 47. This is shown in later figures.

The resistor 72 will be dependent upon the values of the resistors 58, 45, and 47 and upon the operating characteristics of the particular tube chosen for tube 31. Typical values will be found in the manufacturer's specifications for such tubes.

Tubes 18 and 19 may be low mu power tubes. The 6AS7–G dual triode is excellent as the output pair because of its low plate impedance. The output coupling condenser 28 will usually be an electrolytic unit of from 30 to 120 microfarads for audio applications. The supply voltage source 16, when a 6AS7–G is used, may be conveniently obtained from an economical transformerless voltage doubler type of rectifier which has an output of 250 to 260 volts D. C. when used with a 117 volts main supply.

The values of the circuit components of Fig. 2 are also typical values used in resistance coupled stages. The tube 80 may be a type 6AU6.

In Fig. 3 the tubes 130 and 131 may be of the type 6AU6 or 6CB6 and the tubes 18 and 19 may again be 6AS7–G's. Excellent performance is obtained operating into a 150 ohm load. The plate resistors 145 and 150 are usually identical and are chosen so that the D. C. voltage drop across them is only moderately higher than the peak signal voltage that is to be produced across them. In one instance the D. C. drop was set at 90 volts for a peak A. C. signal output of 60 volts. This adjustment produces a rounded wave form representing in this instance about 7 percent of odd harmonics to balance out a substantially equal percentage of even harmonics in the output, presuming a 150 ohm load.

In Fig. 4 the frequency selective feedback circuit which comprises resistors 162 and the condenser 161 have about the same time constant as the parallel combination of resistors 50 and 58 in conjunction with the stray capacitance as represented by the condenser 160. The capacitance of 160 may range from 5 to 25 micromicrofarads and the condenser 161 usually has the same magnitude.

The grid resistor 50 of Fig. 4 is a typical grid leak value and resistors 52 and 54 are usually of the same general magnitude as the resistor 50. The condenser 164 is chosen so that in conjunction with the parallel combination of resistors 52 and 54 the time constant will preferably be at least several times larger than the time constant of coupling condenser 43 in conjunction with grid resistor 50.

In Fig. 5 the time constants of the frequency selective feedback paths to the grid of the tube 130 and to the cathode junction of tubes 130 and 131 have substantially the same time constant as the combination of stray capacity 160 in conjunction with the effective plate load of the tube 140.

The artisan will appreciate that the comments made above point out the manner in which the values of the circuit components will easily be obtained with a minimum of effort. There necessarily will be wide ranges to suit the purposes and requirements of the amplifier. As for loads, these may consist of various types of speakers, electro-magnetic devices, and the like and their impedances may vary widely.

What it is desired to secure by Letters Patent of the United States is:

1. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, there being a potential source connected between the plate of the said first tube and the cathode of the second tube, an input stage for receiving an incoming signal and applying a component of same to the grid of the said first tube and including a third tube having cathode, grid, and plate, with the plate being connected to the grid of the said first tube, means for applying a second component of the incoming signal to the grid of said second tube, means for applying a load sensing voltage to the grid of said first tube for lifting the input signal thereof above the load signal, which comprises a connection between the juncture and the plate of the said third tube and having at least a series-connected impedance therein serving as the plate load of the said third tube, the signal components applied to the said first and second tubes being substantially of equal amplitude and opposed phase, and there being an electrical path between the juncture and the cathode of the said third tube for feeding a portion of said sensing voltage to the said third tube in order to increase the effective plate resistance thereof.

2. An amplifier as described in claim 1 in which the said electrical path comprises at least a series connected resistor and condenser.

3. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, there being a potential source connected between the plate of the said first tube and the cathode of the second tube, an input stage for receiving an incoming signal and applying a component of same to the grid of the said first tube and including a third tube having cathode, grid, and plate, with the plate being connected to the grid of the said first tube, means for applying a second component of the incoming signal to the grid of said second tube, means for applying a load sensing voltage to the grid of said first tube for lifting the input signal thereof above the load signal, which comprises a connection between the juncture and the plate of the said third tube and having at least a series-connected impedance therein serving as the plate load of the said third tube, the signal components applied to the said first and second tubes being substantially of equal amplitude and opposed phase, and an impedance connected across the potential source, said one tube having a grid leak connected between its grid and a tap in said impedance.

4. An amplifier as described in claim 3 in which there is an electrical connection including a D. C. blocking device between said juncture and said tap whereby to drive the bottom end of the grid leak.

5. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, there being a potential source connected between the plate of the said first tube and the cathode of the second tube, an input stage for receiving an incoming signal and applying a component of same to the grid of the said first tube and including a third tube having cathode, grid, and plate, with the plate being connected to the grid of the said first tube, means for applying a second component of the incoming signal to the grid of said second tube, means for applying a load sensing voltage to the grid of said first tube for lifting the input signal thereof above the load signal, which comprises a connection between the juncture and the plate of the said third tube and having at least a series-connected impedance therein serving as the plate load of the said third tube, the signal components applied to the said first and second tubes being substantially of equal amplitude and opposed phase, and there being an electrical path between the juncture and the cathode of the third tube, the impedance of the path varying with frequency to increase feedback to said cathode with increase of frequency and thereby achieving phase correction at high frequencies.

6. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, there being a potential source connected between the plate of the said first tube and the cathode of the second tube, an input stage for receiving an incoming signal and applying a component of same to the grid of the said first tube and including a third tube having cathode, grid, and plate, with the plate being connected to the grid of the said first tube, means for applying a second component of the incoming signal to the grid of said second tube, means for applying a load sensing voltage to the grid of said first tube for lifting the input signal thereof above the load signal, which comprises a connection between the juncture and the plate of the said third tube and having at least a series-connected impedance therein serving as the plate load of the said third tube, the signal components applied to the said first and second tubes being substantially of equal amplitude and opposed phase, said input stage comprising a pair of cathode-coupled tubes including the said third tube and a fourth tube, the cathode-coupled pair of tubes having a common cathode coupling impedance, means for applying the incoming signal to the grid of the fourth tube and means for driving the grid of the second tube from the plate circuit of the fourth tube, the signal at the plate of the third tube being of opposite phase to the signal at the plate circuit of the fourth tube by virtue of the cathode-coupled connection.

7. An amplifier circuit for driving a load, said circuit including a pair of series-connected tubes for providing substantially balanced output for said load, the tubes each having at least a cathode, grid and plate, the cathode of the first tube and plate of the second tube being joined at least signal-wise and forming thereby a load-connecting juncture, the load adapted to be connected between said juncture and ground, there being a potential source connected between the plate of the said first tube and the cathode of the second tube, an input stage for receiving an incoming signal and applying a component of same to the grid of the said first tube and including a third tube having cathode, grid, and plate, with the plate being connected to the grid of the said first tube, means for applying a second component of the incoming signal to the grid of said second tube, means for applying a load sensing voltage to the grid of said first tube for lifting the input signal thereof above the load signal, which comprises a connection between the juncture and the plate of the said third tube and having at least a series-connected impedance therein serving as the plate load of the said third tube, the signal components applied to the said first and second tubes being substantially of equal amplitude and opposed phase, said input stage comprising a cathode-coupled pair of tubes including said third tube and a fourth tube, the cathode-coupled pair having a common cathode coupling impedance, means for applying the incoming signal to the grid of the third tube, the signal at the plate of the fourth tube being of opposite phase to the signal at the plate of the third tube by virtue of said cathode-coupled connection, and means for driving the second grid from the plate circuit of the fourth tube.

8. An amplifier as described in claim 6 in which the circuit constants of the cathode-coupled pair of tubes are such that the tubes are driven close to cut-off thereby producing rounded wave form signal components to compensate for peaked wave form in the signals produced in a load of very low impedance.

9. An amplifier as described in claim 7 in which the circuit constants of the cathode-coupled pair of tubes are such that the tubes are driven close to cut-off thereby producing rounded wave form signal components to compensate for peaked wave form in the signals produced in a load of very low impedance.

10. An amplifier as described in claim 7 in which there is a path between the said juncture and the common cathodes of the third and fourth tubes having an impedance which varies with high frequency to supply a voltage to compensate for losses and phase shift due to stray capacitance paths from the grid of the said first tube at high frequencies, and means for rendering the said fourth tube unaffected by the voltage provided by said path.

11. An amplifier as described in claim 7 in which there is a path between the said juncture and the common cathodes of the third and fourth tubes having an impedance which varies with high frequency to supply a voltage to compensate for losses and phase shift due to stray capacitance paths from the grid of the said first tube at high frequencies, and means for rendering the said fourth tube unaffected by the voltage provided by said path comprising a second path connected between said juncture and the grid of the said fourth tube and affecting said tube in an opposite manner.

12. An amplifier circuit for driving a load, said circuit including a pair of series-connected tubes for providing substantially balanced output for said load, the tubes each having at least a cathode, grid and plate, the cathode of the first tube and the plate of the second tube being joined at least signal-wise and forming thereby a load connecting juncture, the load adapted to be connected between said juncture and ground, there being a potential source connected between the plate of the first tube and the cathode of the second tube, an input stage for receiving an incoming signal and applying a component of the same to the grid of one of said first and second tubes, and including a third tube having cathode, grid and plate, with the plate being connected to the grid of said one of said first and second tubes, means for applying a second component of the incoming signal to the grid of the other of said first and second tubes, means for applying a load sensing voltage to the grid of said one of said first and second tubes for adjusting the input signal thereof to be substantially equal to the input signal of the other of said first and second tubes, which comprises a connection between the juncture and the plate of the said third tube and having at least a series connected impedance therein serving as the plate load of the said third tube, the signal components applied to said first and second tubes being substantially of equal amplitude and opposed phase, and there being an electrical path between the juncture and the cathode of said third tube for feeding a portion of said sensing voltage to the said third tube.

13. An amplifier as described in claim 12 in which the said electrical path includes means for increasing the effective plate resistance of the said third tube.

14. An amplifier as described in claim 13 in which the last mentioned means comprises at least a series connected resistor and a condenser.

15. An amplifier as described in claim 12 in which the said path has means therein whose impedance varies with frequency to increase feedback to the said cathode of the third tube with increase of frequency and thereby achieve phase correction at high frequencies.

16. An amplifier circuit for driving a load, said circuit including a pair of series-connected tubes for providing substantially balanced output for said load, the tubes each having at least a cathode, grid and plate, the cathode of the first tube and the plate of the second tube being joined at least signal-wise and forming thereby a load connecting juncture, the load adapted to be connected between said juncture and ground, there being a potential source connected between the plate of the first tube and the cathode of the second tube, an input stage for receiving an incoming signal and applying a component of the same to the grid of one of said first and second tubes, and including a third tube having cathode, grid and plate, with the plate being connected to the grid of said one of said first and second tubes, means for applying a second component of the incoming signal to the grid of the other of said first and second tubes, means for applying a load sensing voltage to the grid of said one of said first and second tubes for adjusting the input signal thereof to be substantially equal to the input signal of the other of said first and second tubes, which comprises a connection between the juncture and the plate of the said third tube and having at least a series connected impedance therein serving as the plate load of the said third tube, the signal components applied to said first and second tubes being substantially of equal amplitude and opposed phase, and an impedance having a tap therein connected across the potential source, said one tube having a grid leak connected between its grid and said tap.

17. An amplifier as described in claim 16 in which there is an electrical connection including a D. C. blocking device between said juncture and said tap whereby to drive the tap-connected end of said grid leak.

18. An amplifier circuit for driving a load, said circuit including a pair of series-connected tubes for providing substantially balanced output for said load, the tubes each having at least a cathode, grid and plate, the cathode of the first tube and the plate of the second tube being joined at least signal-wise and forming thereby a load connecting juncture, the load adapted to be connected between said juncture and ground, there being a potential source connected between the plate of the first tube and the cathode of the second tube, an input stage for receiving an incoming signal and applying a component of the same to the grid of one of said first and second tubes, and including a third tube having cathode, grid and plate, with the plate being connected to the grid of said one of said first and second tubes, means for applying a second component of the incoming signal to the grid of the other of said first and second tubes, means for applying a load sensing voltage to the grid of said one of said first and second tubes for adjusting the input signal thereof to be substantially equal to the input signal of the other of said first and second tubes, which comprises a connection between the juncture and the plate of the said third tube and having at least a series connected impedance therein serving as the plate load of the said third tube, the signal components applied to said first and second tubes being substantially of equal amplitude and opposed phase, said input stage comprising a pair of cathode-coupled tubes including the third tube and a fourth tube having at least cathode, grid and plate, the cathode-coupled pair of tubes having a common cathode coupling impedance, the signals at the plates of said third and fourth tubes being of opposite phase by virtue of said cathode coupled connection, means for applying said incoming signal to one of the grids of said third and fourth tubes, and the said means for applying the second component of the incoming signal comprising a connection from the plate of the fourth tube and said other of said first and second tubes.

19. An amplifier as described in claim 18 in which the incoming signal is applied to the grid of the fourth tube.

20. An amplifier as described in claim 18 in which the incoming signal is applied to the grid of the third tube.

21. An amplifier as described in claim 19 in which the circuit constants of the cathode-coupled pair of tubes are such that the tubes are driven close to cut-off thereby producing rounded wave form signal components to compensate for peaked wave form in the signals produced in a load of very low impedance.

22. An amplifier as described in claim 20 in which the circuit constants of the cathode-coupled pair of tubes are such that the tubes are driven close to cut-off thereby producing rounded wave form signal components to compensate for peaked wave form in the signals produced in a load of very low impedance.

23. An amplifier as described in claim 20 in which there is a path between the said juncture and the common cathodes of the third and fourth tubes having an impedance which varies with high frequency to supply a voltage to compensate for losses and phase shift due to stray capacitance paths from the grid of the said first tube at high frequencies, and means for rendering the said fourth tube unaffected by the voltage provided by said path.

24. An amplifier as described in claim 20 in which there is a path between the said juncture and the common cathodes of the third and fourth tubes having an impedance which varies with high frequency to supply a voltage to compensate for losses and phase shift due to stray capacitance paths from the grid of the said first tube at high frequencies, and means for rendering the said fourth tube unaffected by the voltage provided by said path comprising a second path connected between said juncture and the grid of the said fourth tube and affecting said tube in an opposite manner.

References Cited in the file of this patent

UNITED STATES PATENTS

| | | |
|---|---|---|
| 1,985,923 | Gutman | Jan. 1, 1935 |
| 2,423,931 | Etter | July 15, 1947 |
| 2,488,567 | Stodola | Nov. 22, 1949 |
| 2,525,632 | Anderson | Oct. 10, 1950 |

OTHER REFERENCES

"The General Radio Experimenter," volume XXVI, No. 5, October 1951.